(12) United States Patent
Sone et al.

(10) Patent No.: US 6,280,336 B1
(45) Date of Patent: Aug. 28, 2001

(54) COMPACT AXLE HUB UNIT

(75) Inventors: Keisuke Sone, Hamamatsu; Akira Wakita, Iwata, both of (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/157,372

(22) Filed: Sep. 21, 1998

(30) Foreign Application Priority Data

Sep. 26, 1997 (JP) .................................................... 9-262155

(51) Int. Cl.[7] ........................................................ F16D 3/16
(52) U.S. Cl. ........................................... 464/145; 464/906
(58) Field of Search ..................................... 464/143, 145, 464/146, 182, 906, 141; 403/359.6; 180/258; 301/105.1, 124.1

(56) References Cited

U.S. PATENT DOCUMENTS 4,424,047 * 1/1984 Welschof et al. ..................... 464/145
5,975,767 * 11/1999 Mizukoshi et al. ............... 464/145 X

FOREIGN PATENT DOCUMENTS

802341 * 10/1997 (EP) .
97/24538 * 7/1997 (WO) .

* cited by examiner

Primary Examiner—Lynne H. Browne
Assistant Examiner—Greg Binda
(74) Attorney, Agent, or Firm—Arent Fox Kintner Plotkin & Kahn, PLLC

(57) ABSTRACT

A hub unit includes an axle hub, a brake rotor, an axle bearing, and a constant velocity universal joint and transmits power of an engine of an automobile to drive wheels via a drive shaft. The axle hub takes the role as a bearing inner ring of the axle bearing and an outer joint member of the constant velocity universal joint. The axle hub, brake rotor, axel bearing, and constant velocity universal joint are compactly assembled. The ratio r2 (=$D_{outer}$/$PCD_{serr}$) between the outer diameter $D_{outer}$ of the axle hub (outer joint member) and the pitch circle diameter ($PCD_{serr}$) of the tooth profile (serrations or splines) of the fitting portion of the inner joint member is set in a range of $2.5 \leq r2 < 3.2$.

1 Claim, 4 Drawing Sheets ical joint center of the joint

COMPACT AXLE HUB UNIT

BACKGROUND OF THE INVENTION

The present invention relates to a hub unit incorporated in the drive wheel side of a vehicle, etc.

Since it is necessary that a power transmission device which transmits the power of engine of an automobile, etc., to wheels matches angular and axial displacement resulting from changes in the relative positional relationship between engine and wheels, for example, one end of a drive shaft intervening between the engine side and the drive wheel side is connected to differential gears via a plunging type constant velocity universal joint while the other end is connected to drive wheel via a hub unit including a fixed type constant velocity universal joint. The hub unit comprises an axle hub connected to drive wheel along with brake rotor, an axle bearing which rotatably supports the axle hub with respect to body side supporting member (knuckle portion, etc.), and a constant velocity universal joint for transmitting power of the drive shaft to the axle hub. As a constant velocity universal joint of the hub unit, such a structure (ball fixed joint) has generally been known, in which torque transmitting balls are, respectively, disposed in six ball tracks opened to be like a wedge in one axial direction.

As regards the hub unit, such a structure (hereinafter called a "compact type hub unit") has been developed, in which an axle hub, axle bearing and constant velocity universal joint are assembled with each other, and various types thereof have been proposed, in view of decreasing the production costs, number of assembling steps, lightening the weight, widening the operating angle in line with movements of the joint center, and improving the steering performance. However, conventional compact type hub units have problems as described below, which become obstacles in practical applications.

(1) The design of tire size, wheel rim and brake rotor is determined in order, depending on the output of engine, and the diameter of a shaft portion of the constant velocity universal joint is also determined on the basis of the engine output. The compact type hub unit is constructed so that the axle bearing intervenes between the brake rotor and an outer joint member (also acting as the axle hub) of the constant velocity universal joint. Actually however, since the outer diameter of the axle bearing is made too large, it is difficult to accommodate the hub unit at the bore side of the brake rotor.

(2) Since the axle bearing and the constant velocity universal joint are very close to each other, the internal exothermic reaction of the constant velocity universal joint is transmitted to the axle bearing, and there is a possibility that the service life of the bearing is decreased.

(3) Since on the bore side of the brake rotor the empty space is small heat collects therein resulting in a temperature rise of the axle bearing and the exothermic reaction of the brake.

(4) In comparison with a case where the respective members are independently disposed, the total weight is decreased. However, the hub unit itself is made heavy and its scale is increased. Thus, it is difficult to handle the hub unit.

SUMMARY OF THE INVENTION

The present invention has an object to solve the abovementioned problems inherent to the conventional compact type hub units.

In order to solve the abovementioned problems, the invention provides a hub unit comprising an axle hub connected to a drive wheel; an axle bearing disposed on the outer circumferential surface of the axle hub, which rotatably supports the axle hub with respect to a body side supporting member; and a constant velocity universal joint for transmitting the power of the drive shaft to the axle hub, wherein the constant velocity universal joint comprises the axle hub acting as an outer joint member having eight curved outside guide grooves formed on a spherical inner circumferential surface thereof in the axial direction; an inner joint member having eight curved inside guide grooves formed on a spherical outer circumferential surface thereof in the axial direction and a fitting portion having tooth profile for connecting the drive shaft formed on an inner circumferential surface thereof; eight torque transmitting balls disposed in eight ball tracks respectively, the ball tracks being formed by cooperation of the outside guide grooves of the axle hub and the inside guide grooves of the inner joint member corresponding to each other and are opened to be wedge-like in one axial direction; and a cage for retaining the torque transmitting balls, and wherein the ratio r2 (DOUTER/PCDSERR) of the outer diameter (DOUTER) of the axle hub to the pitch circle diameter (PCDSERR) of the tooth profile of the fitting portion of the inner joint member is $2.5 \leq r2 < 3.2$.

The reason why $2.5 \leq r2 < 3.2$ is employed resides in the following. That is, the pitch circle diameter (PCDSERR) of the tooth profile of the fitting portion of the inner joint member can not be greatly changed due to the relationship with the strength of the drive shaft or the like. Therefore, the value of r2 mainly depends on the outer diameter (DOUTER) of the axle hub (outer joint member). If $r2 < 2.5$ (mainly in a case where the outer diameter DOUTER is smaller), the thickness of the respective parts (outer joint member, inner joint members, etc.) is made too thin, there remains a worry in view of the strength. On the other hand, if $r2 \geq 3.2$ (mainly in a case where the outer diameter DOUTER is greater), there is a case where a problem arises in practical applications in the dimensional aspect, and an object to make the unit compact can not be achieved. In addition, the general value of r2 of a six-ball constant velocity universal joint is $r2 \geq 3.2$.

By employing $2.5 \leq r2 < 3.2$, it is possible to secure the strength of the axle hub (outer joint member), etc., and the durability of the joint equivalent to or greater than a comparative joint (six-ball constant velocity universal joint), and it is possible to make the outer diameter (DOUTER) of the axle hub compact.

The invention has the following effects and advantages.

(1) Since the outer diameter (DOUTER) of the axle hub (concurrently acting as the outer joint member of the constant velocity universal joint) can be made smaller than ever, it becomes easy to make a design of accommodating the axle bearing on the bore side of the brake rotor.

(2) Since the constant velocity universal joint is heated less than a comparative joint (a six-ball constant velocity universal joint), the adverse influence on the temperature rise of the axle bearing and the exothermic reaction of the brake due is suppressed, so that the service life of the bearing or brake is further improved.

(3) Since the outer diameter (DOUTER) of the axle hub is made small, the entire unit can be made light and compact, and its handling made easy.

DETAILED DESCRIPTION OF PREFERRED EMBODIMENTS

Hereinafter, a description is given of preferred embodiments of the invention with reference to the accompanying drawings.

Figures 1, 1A:
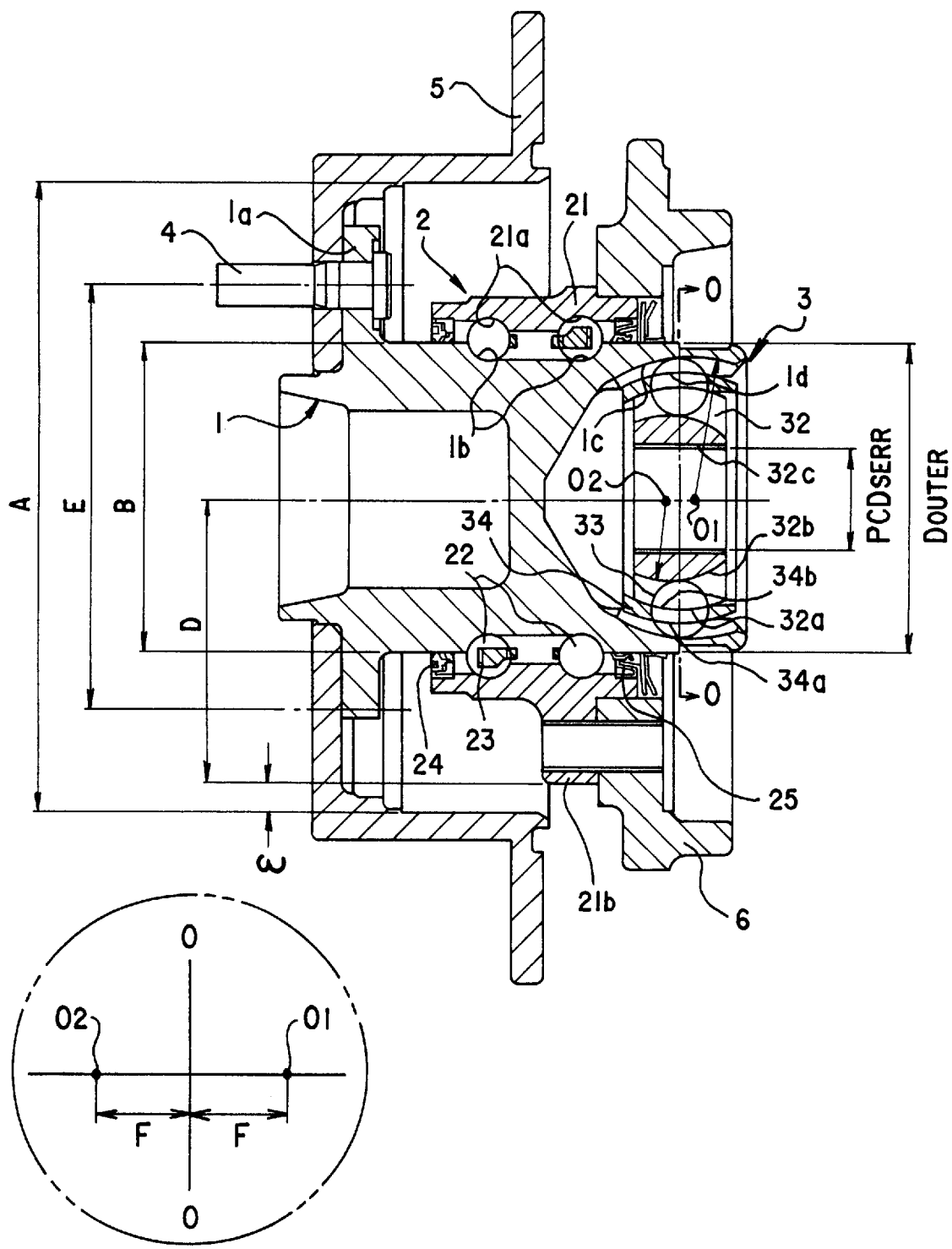
FIG. 1 is a longitudinally sectional view showing a preferred embodiment of the invention.
FIG. 1a is a schematic showing the offset of the center of the outside and inside grooves from the spherical outer circumferential surfaces.
Figure 2:
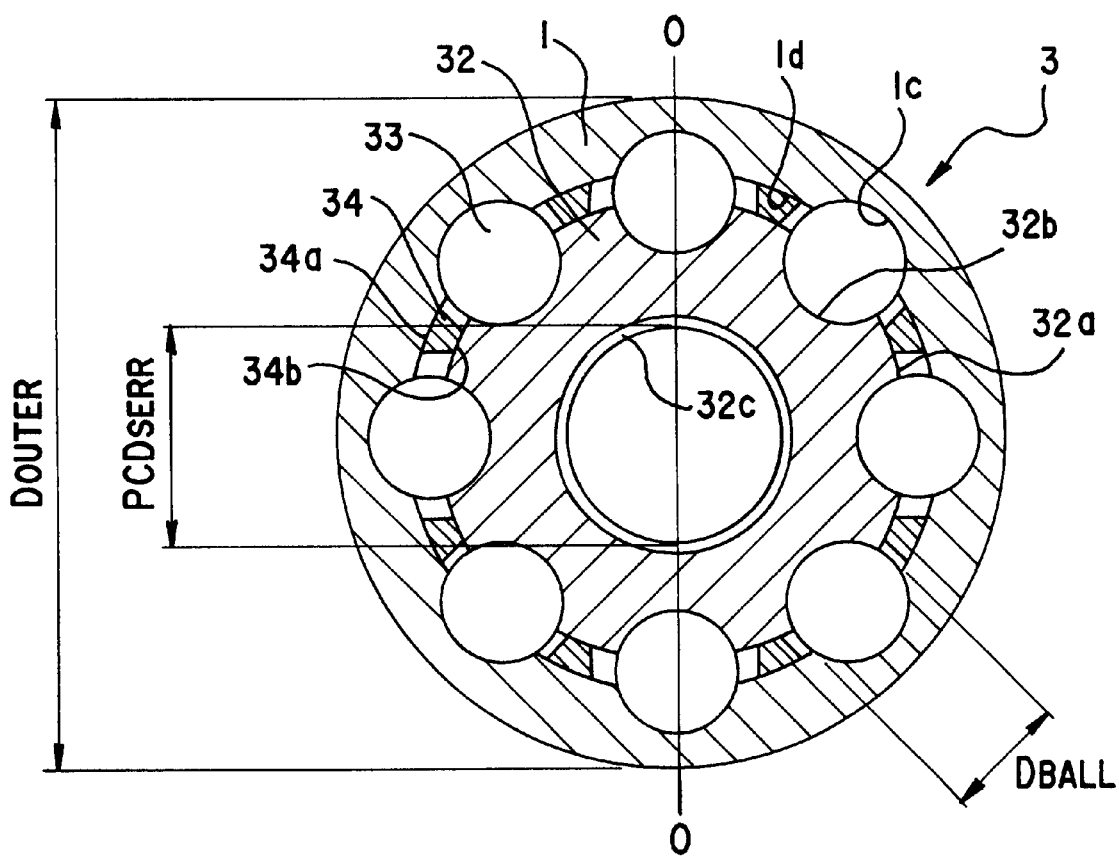
FIG. 2 is a cross-sectional view taken along 0—0 of the constant velocity universal joint in FIG. 1.

A hub unit shown in FIG. 1 and FIG. 2 comprises an axle hub 1, an axle bearing 2, and a constant velocity universal joint 3 and transmits power of an engine of an automobile to drive wheels via a drive shaft. The axle hub 1 takes the role as a bearing inner ring of the axle bearing 2 and an outer joint member of the constant velocity universal joint 3, wherein the axle 1, axle bearing 2, ans constant velocity universal joint 3 are compactly assembled. Furthermore, the lengths A, B, D, and E shown in the drawings are established in the following relationship.

$D \leq (A/2) + \epsilon$ ($\epsilon$: Clearance)

$B \approx D_{OUTER}$ where B is a length by which a hub bolt 4 existing at E can be inserted.

Further, A is the inner diameter of the brake rotor; B is the outer diameter of the axle hub at one end portion; D is a length between the axis of the axle hub and the outer diameter of the flange portion of the outer ring of the axle bearing; E is a length which is two times larger than a dimension between the axis of the axle hub and the axis of the hub bolt; and $\epsilon$ is a clearance between the inner diameter of the brake rotor and the outer diameter of the flange portion of the outer ring of the axle bearing.

The axle hub 1 is provided with a flange portion 1a for mounting the hub bolt 4 at one end portion on the outer circumferential surface thereof, a duplex inside raceway surface 1b of the axle bearing 2 at the middle part on the outer circumferential surface thereof and, further, outside guide grooves Ic of the constant velocity universal joint 3 at the other end portion on the inner circumferential surface 1d thereof. The axle hub 1 is inserted in the bore surface of a brake rotor 5 and is connected to a drive wheel along with the brake rotor 5 by hub bolts 4 attached to the flange portion 1a.

The axle bearing 2 comprises an outer ring 21 having duplex outside raceway surfaces 21a, duplex rows of balls 22 which intervene between the outside raceway surfaces 21a of the outer ring 21 and the inside raceway surfaces 1b of the axle hub 1, a cage 23 which retains balls 22 in an appointed interval of the circumference, and seals 24 and 25 at both ends. A flange portion 21b is formed on the outer circumferential surface of the outer ring 21, and the outer ring 21 is connected by bolts attached to the flange portion 21b to a knuckle portion 6 as a car body side supporting member.

The constant velocity universal joint 3 comprises the axle hub 1, as an outer joint member, having eight curved outside guide grooves lc formed on the spherical inner circumferential surface 1d at the other end in the axial direction, an inner joint member 32 having eight curved inside guide grooves 32b formed on the spherical outer circumferential surface 32a in the axial direction and having a fitting portion 32c, which has tooth profile (serrations or splines), formed on the inner circumferential surface, eight torque transmitting balls 33, respectively, disposed in eight ball tracks formed by cooperation of the outside guide grooves 1c and the inside guide grooves 32b corresponding to each other, and a cage 34 which retains the torque transmitting balls 33. The drive shaft is fitted to the fitting portion 32c of the inner joint member 32 by tooth profile fitting (that is, they are serration-fitted to or spline-fitted to each other).

In this embodiment, the center 01 of the outside guide grooves 1c of axle hub 1 is offset by a distance (F) from the spherical center of the spherical inner circumferential surface 1d to one axial direction (to the opening side of the joint), and the center 02 of the inside guide grooves 32b of the inner joint member 32 is offset by an equal distance (F) from the spherical center of the spherical outer circumferential surface 32a to the other axial direction (to the deep side of the joint). Therefore, the ball tracks formed by cooperation of the outside guide grooves 1c and the inside guide grooves 32b corresponding to each other are shaped to widen to the opening side of the joint like wedges. The spherical center of the spherical outer circumferential surface 34a of the cage 34 and the spherical center of the spherical inner circumferential surface 1d of the axle hub 1, which becomes a guide surface of the spherical outer circumferential surface 34a of the cage 34 are, respectively, located at the joint center plane 0 including the center of the torque transmitting balls 3. Furthermore, the spherical center of the spherical inner circumferential surface 34b of the cage 34 and the spherical center of the spherical outer circumferential surface 32a of the inner joint member 32, which becomes the guide surface of the spherical inner circumferential surface 34b of the cage 34, respectively reside in the joint center plane 0. Therefore, the abovementioned offset amount (F) of the outside guide grooves 1c becomes the axial distance between the center 01 and the joint center surface 0, and the abovementioned offset amount (F) of the inside guide grooves 32b becomes the axial distance between the center 02 and the joint center surface 0, wherein both are equal to each other. The center 01 of the outside guide grooves 1c and the center 02 of the inside guide grooves 32b are offset by an equal distance (F) to the opposite side in the axial direction (to the opening side of the joint as regards the center 01, and to the deep side of the joint as regards the center 02) with respect to the joint center plane 0.

When the axle hub (outer joint member) 1 and the inner joint member 32 are angularly displaced by an angle θ, the torque transmitting balls 33 guided by the cage 34 are always maintained in the two-equal dividing planes (θ/2) of the angle θ at any operating angle θ, and the constant velocity of the joint can be assured.

The ratio r1 (=PCD$_{BALL}$/D$_{BALL}$) between the pitch circle diameter (PCD$_{BALL}$) and diameter (D$_{BALL}$) of the torque transmitting balls 33 is able to be in a range of $3.3 \leq r1 \leq 5.0$. Herein, the pitch circle diameter (PCD$_{BALL}$) of the torque transmitting balls is two times PCR (PCD$_{BALL}$=2 ×PCR). The length of a line segment connecting the center 01 of the outside guide groove 1c to the center of the torque transmitting ball 33, and length of a line segment connecting the center 02 of the inside guide groove 32b to the center of the torque transmitting ball 33 is respectively PCR, wherein both are equal to each other.

The reason why $3.3 \leq r1 \leq 5.0$ is employed is to secure the strength of the axle hub (outer joint member) 1, etc., load capacity and durability of the joints equivalent to or more than those of a comparative joint (a six-ball constant velocity universal joint). That is, in a constant velocity universal joint, it is difficult that pitch circle diameter (PCD$_{BALL}$) of torque transmitting balls is greatly changed in a limited space. Therefore, the value of r1 mainly depends on diameter (D$_{BALL}$) of torque transmitting balls. If r1<3.3 (mainly in a case where the diameter D$_{BALL}$ is greater), the thickness of the other components (outer joint member, inner joint member, etc.) is made too thin, wherein a worry arises in view of the strength. To the contrary, if r1>5.0 (mainly in a case where the diameter D$_{BALL}$ is smaller), the load capacity is made small, wherein a worry arises in view of the durability. Furthermore, the surface pressure at the contact portion between the torque transmitting balls and the guide grooves is increased (since the contacting ellipse is made smaller if the diameter D$_{BALL}$ is made smaller), and it results in a damage of the groove shoulder edge portions of the guide grooves, etc.

By establishing 3.3≦r1≦5.0, it is possible to secure the strength of the axle hub (outer joint member) 1, etc., load capacity and durability of the joints equivalent to or more than those of a comparative joint (a six-ball constant velocity universal joint), preferably the ratio r1 is in a range of 3.5≦r1≦5.0, for example, the ratio is set to r1=3.83 or set to the values in the vicinity of thereof.

The ratio r2 (=D$_{OUTER}$/PCD$_{SERR}$) between the outer diameter D$_{OUTER}$ of the axle hub (outer joint member) and the pitch circle diameter (PCD$_{SERR}$) of the tooth profile (serrations or splines) of the fitting portion 32c of the inner joint member 32 is set in a range of 2.5≦r2<3.2 on the basis of the abovementioned reasons.

In the constant velocity universal joint 3 according to this embodiment, since the number of torque transmitting balls 33 is eight, so that, in comparison with a comparative joint (a six-ball constant velocity universal joint), the load ratio per torque transmitting ball with respect to the total load capacity of the joint is small, the diameter (D$_{BALL}$) of the torque transmitting balls 33 is made smaller than that of the comparative joint (six-ball type constant velocity joint) of the same nominal type to be possible to secure the thickness of the axle hub (outer joint member) 1 and of the inner joint member 32 equivalent to that of the comparative joint (six-ball constant velocity universal joint). Furthermore, the ratio r2 (=D$_{OUTER}$/PCD$_{SERR}$) is made smaller than that of the comparative joint (six-ball type constant velocity universal joint) of the same nominal type (the general value of r2 in the six-ball type constant velocity universal joint is r2≧3.2) to be able to further compact the outer diameter (D$_{OUTER}$) while securing the strength, load capacity and durability equivalent to or more than those of the comparative joint. For example, in a case where the pitch circle diameter (PCD$_{SERR}$) of the fitting portion 2c is made equal to that of the comparative joint, it is possible to reduce the outer diameter (D$_{OUTER}$) by two sizes in terms of the nominal numbers (about 8 percent). Furthermore, it has also proven from the result of experiments that the exothermic reaction is less than that of the comparative joint (six-ball constant velocity universal joint). As described above, in the constant velocity universal joint 3, the outer diameter (D$_{OUTER}$) of the axle hub (outer joint member) 1 can be made smaller than that of the comparative joint (six-ball constant velocity universal joint). Therefore, it becomes easy to make a design of accommodating the axle bearing 2 in the bore side of the brake rotor 5. Furthermore, since the constant velocity universal joint 3 is heated less than the comparative joint (six-ball constant velocity universal joint), temperature rise of the axle bearing 2 and the influence on exothermic reaction of the brake is suppressed, so that the service life of the bearings and brake can be lengthened. Still furthermore, since the outer diameter (D$_{OUTER}$) of the axle hub (outer joint member) 1 is made small, the entire unit can be made light and compact, and its handling is made easier.

Figure 3:
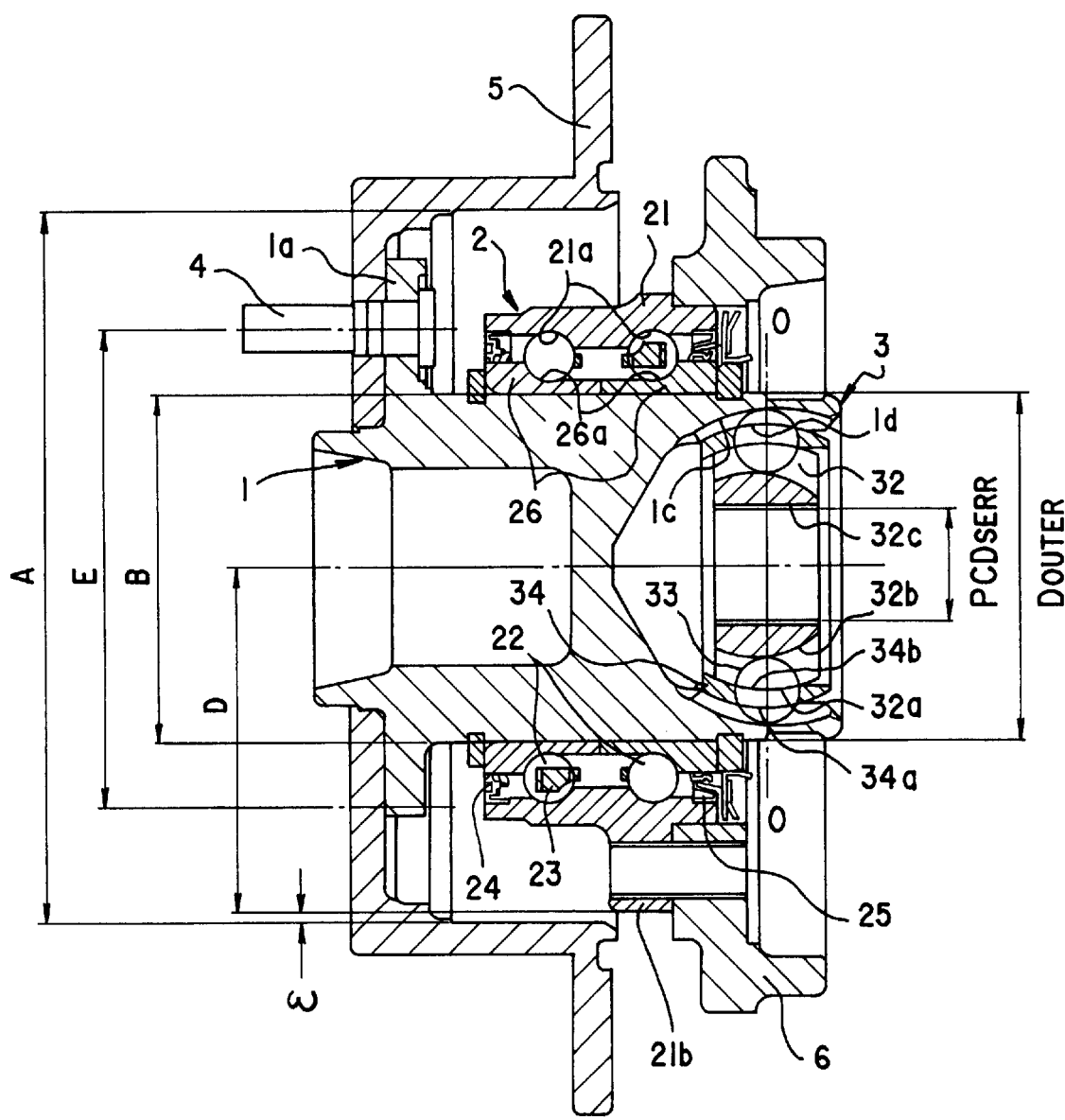
FIG. 3 is a longitudinally sectional view showing the third embodiment of the invention.

In the hub unit shown in FIG. 3, the axle bearing 2 is provided with a pair of inner rings 26 having an inside raceway surface 26a respectively, and the pair of inner rings 26 is fitted to and fixed at the middle part on the outer circumferential surface of the axle hub 1. In comparison with the structure shown in FIG. 1, it is easy to design the axle bearing 2 (in view of preloading, assembling , etc.).

Figure 4:
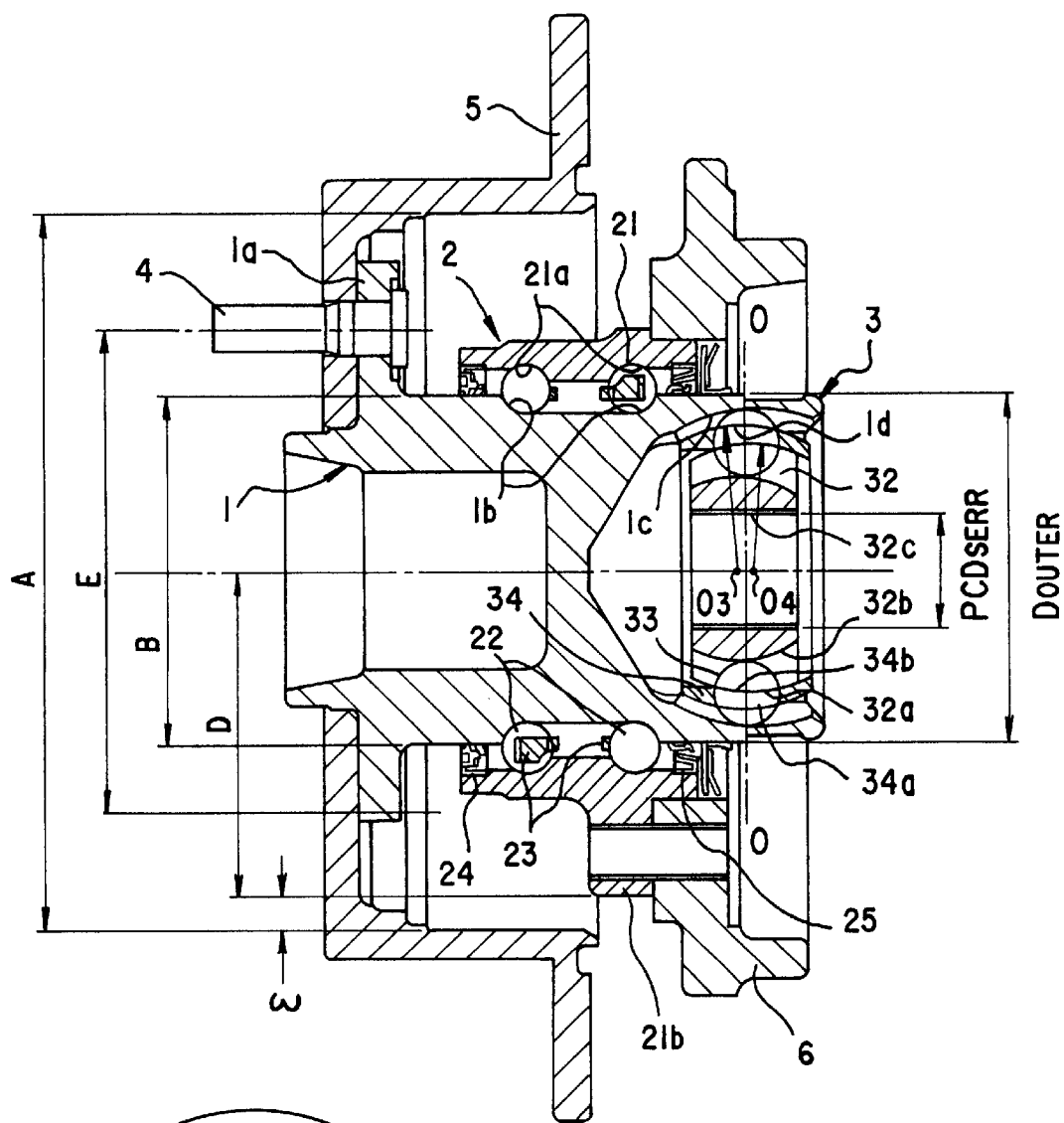
FIG. 4 is a longitudinally sectional view showing the third embodiment of the invention.
Figure 4A:
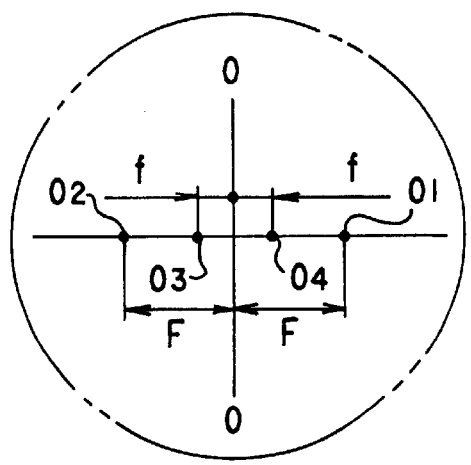
FIG. 4a is a schematic showing the offset of the spherical bore surface.

In the hub unit shown in FIG. 4, the spherical center 03 of the spherical outer circumferential surface 34a of the cage 34 (spherical center of the spherical inner circumferential surface 1d of the axle hub 1) and the spherical center 04 of the spherical bore surface 34b of the cage 34 (spherical center of the spherical outer circumferential surface 32a of the inner joint member 32) are offset to the opposite side equidistantly (f) in the axial direction with respect to the joint center surface 0 including the center of the torque transmitting balls 3 (f<F). By employing the offset (f), since the spherical force (a force generated between the spherical outer circumferential surface 34a and the spherical inner circumferential surface 1d, and between the spherical inner circumferential surface 34b and the spherical outer circumferential surface 32a) around five degrees of angle, which is a normal use angle when the hub unit is applied to a vehicle, is lowered, the exothermic reaction of the joint can be lowered, and the thickness of the inlet port of the cage 34 into which the inner joint member 32 is able to increase to improve the strength thereof.

An axial pocket clearance between each of pockets of the cage 34 and each of the torque transmitting balls 33 may be provided. With the axial pocket clearance provided, since a contacting force between the torque transmitting balls 33 and the cage 34 is decreased, and a friction force between the torque transmitting balls 33 and the ball tracks is decreased in line with reduction in a force of binding the torque transmitting balls 33 by the cage 34, the exothermic reaction of the joint can be lowered.

What is claimed is:

1. A compact axle hub unit comprising:

an axle hub formed with a first flange portion on an outer peripheral surface at one end portion thereof to which a hub bolt is attached, and eight curved outside grooves in a spherical inner peripheral surface at another end portion thereof in an axial direction;

a brake rotor fixed to the one end portion of the axle hub, the brake rotor being connected to a drive wheel along with the axle hub by the hub bolt;

a double-row axle bearing mounted on a middle portion of the axle hub, the axle bearing comprising an outer ring formed with a second flange portion on an outer peripheral surface thereof, the outer ring being connected to a car body side supporting member by a second bolt attached to the second flange portion thereof, the axle bearing partially received within an inner peripheral surface of the brake rotor; and a constant velocity universal joint comprising the axle hub as an outer joint member formed with the eight curved outside guide grooves, an inner joint member formed with eight curved inside guide grooves in an outer peripheral surface thereof in the axial direction, the inner joint member provided with a fitting portion having a tooth profile for connecting a drive shaft to an inner peripheral surface thereof, eight torque transmitting balls each disposed in eight ball tracks formed by cooperation of the outside guide grooves of the axle hub and the inside guide grooves of the inner joint member corresponding to each other, the ball tracks being widened to be wedge-like in the axial direction, and a cage for retaining the torque transmitting balls, the compact axle hub unit comprising a ratio r2 (=$D_{outer}$/$PCD_{SERR}$) of an outer diameter ($D_{OUTER}$) of the axle hub at another end portion thereof to a pitch circle diameter ($PCD_{SERR}$) of the tooth profile of the fitting portion of the inner joint member is $2.5 \leq r2 < 3.2$; and a relationship in which A is the inner diameter of the brake rotor;

B is the outer diameter of the axle hub at the one end portion;

D is a length between the axis of the axle hub and the outer diameter of the second flange portion of the outer ring of the axle bearing;

$\epsilon$ is a clearance between the inner diameter of the brake rotor and the outer diameter of the second flange portion of the outer ring of the axle bearing; and $D \leq (A/2) + \epsilon$ $B \approx D_{OUTER}$ wherein the diameter of B allows the hub bolt to attach to the first flange portion of the axle hub.

* * * * *